(12) United States Patent
Gaudreault

(10) Patent No.: US 10,721,872 B2
(45) Date of Patent: Jul. 28, 2020

(54) BALING APPARATUS AND METHOD

(71) Applicant: Daniel Gaudreault, Summerville, SC (US)

(72) Inventor: Daniel Gaudreault, Summerville, SC (US)

( * ) Notice: Subject to any disclaimer, the term of this patent is extended or adjusted under 35 U.S.C. 154(b) by 1116 days.

(21) Appl. No.: 14/716,229

(22) Filed: May 19, 2015

(65) Prior Publication Data

US 2015/0327442 A1 Nov. 19, 2015

Related U.S. Application Data

(60) Provisional application No. 62/000,221, filed on May 19, 2014.

(51) Int. Cl.
  *A01F 15/08* (2006.01)
  *A01F 15/07* (2006.01)
  *B30B 9/30* (2006.01)

(52) U.S. Cl.
  CPC ........ *A01F 15/085* (2013.01); *A01F 15/0715* (2013.01); *B30B 9/3007* (2013.01); *B30B 9/3082* (2013.01); *A01F 2015/077* (2013.01)

(58) Field of Classification Search
  CPC .......... A01F 2015/072; A01F 2015/076; A01F 2015/0725; A01F 2015/073; A01F 2015/0735; A01F 2015/186; A01F 2015/077; A01F 15/07; A01F 15/074; A01F 15/071; A01F 15/08; A01F 15/0715; A01F 15/085; B65B 41/12; B65B 59/04; B30B 9/3007; B30B 9/3082

USPC ... 53/397, 399, 587, 588, 389.2–389.4, 393, 53/77, 116–118, 176, 210, 211, 430
See application file for complete search history.

(56) References Cited

U.S. PATENT DOCUMENTS

| | | | | | |
|---|---|---|---|---|---|
| 4,228,638 | A | * | 10/1980 | Rabe | A01F 15/0816 100/74 |
| 4,375,187 | A | * | 3/1983 | Kluver | A01F 15/0883 100/88 |
| 4,567,998 | A | * | 2/1986 | Cole | A01F 15/0816 222/231 |
| 4,580,398 | A | * | 4/1986 | Bruer | A01F 15/0705 100/5 |

(Continued)

FOREIGN PATENT DOCUMENTS

KR 20140063980 A * 5/2014

*Primary Examiner* — Dariush Seif
(74) *Attorney, Agent, or Firm* — Southeast IP Group, LLC; Thomas L. Moses

(57) ABSTRACT

A baling apparatus includes a housing having a fixed portion and a hinged door to release a bale, a series of rollers and belts for compressing and rotating baling material into a bale, a wrap feed mechanism for feeding a wrap around a bale, and means for compressing the bale during the baling operation. The instant baling apparatus may be used for materials that have traditionally been difficult to bale successfully, including small particulate such as mulch, and other materials such as common household trash. The baling apparatus may be utilized as a separate unit, or may be combined with a brush cutter/mulcher, or incorporated into trash removal equipment. A touch screen display and computer may be used in combination with sensors to monitor and control the baling operation, and a hydraulic system is used to drive the components.

10 Claims, 9 Drawing Sheets

(56) References Cited

U.S. PATENT DOCUMENTS

| | | | | |
|---|---|---|---|---|
| 4,599,844 | A * | 7/1986 | Clostermeyer | A01F 15/0715 53/118 |
| 4,619,106 | A * | 10/1986 | van der Lely | A01F 15/07 100/89 |
| 4,651,512 | A * | 3/1987 | van der Lely | A01F 15/0705 100/88 |
| 4,656,812 | A * | 4/1987 | Busse | A01F 15/0715 53/118 |
| 5,115,734 | A * | 5/1992 | Quartaert | A01F 15/0705 100/5 |
| 5,129,207 | A * | 7/1992 | Butler | A01F 15/0715 53/118 |
| 5,224,329 | A * | 7/1993 | Viaud | A01F 15/07 100/88 |
| 5,255,501 | A * | 10/1993 | McWilliams | A01F 15/07 100/88 |
| 5,367,865 | A * | 11/1994 | Jennings | A01F 15/0833 100/88 |
| 6,021,622 | A * | 2/2000 | Underhill | A01F 15/0715 53/118 |
| 6,722,110 | B1 * | 4/2004 | Royneberg | A01F 15/071 100/15 |
| 8,656,686 | B2 * | 2/2014 | Smith | A01F 15/0715 493/370 |
| 8,910,460 | B2 * | 12/2014 | Horstmann | A01F 15/106 56/341 |
| 2001/0013214 | A1 * | 8/2001 | Viaud | A01F 15/0705 53/116 |
| 2002/0100375 | A1 * | 8/2002 | Deutsch | A01F 15/07 100/8 |
| 2003/0093979 | A1 * | 5/2003 | Fukumori | A01F 15/07 53/587 |
| 2004/0074209 | A1 * | 4/2004 | Fukumori | A01F 15/0715 53/116 |
| 2005/0247215 | A1 * | 11/2005 | Biziorek | A01F 15/07 100/87 |
| 2009/0107102 | A1 * | 4/2009 | Biziorek | A01F 15/0715 56/341 |
| 2009/0272072 | A1 * | 11/2009 | Paillet | A01F 15/0715 53/118 |
| 2009/0282788 | A1 * | 11/2009 | McClure | A01F 15/0715 53/587 |
| 2010/0024357 | A1 * | 2/2010 | Viaud | A01F 15/071 53/116 |
| 2011/0100236 | A1 * | 5/2011 | Viaud | A01F 15/0833 100/87 |
| 2012/0096827 | A1 * | 4/2012 | Chaney | A01F 15/0833 56/341 |
| 2014/0165856 | A1 * | 6/2014 | Varley | A01F 15/0705 100/40 |
| 2014/0261022 | A1 * | 9/2014 | Smith | A01F 15/0883 100/40 |

\* cited by examiner

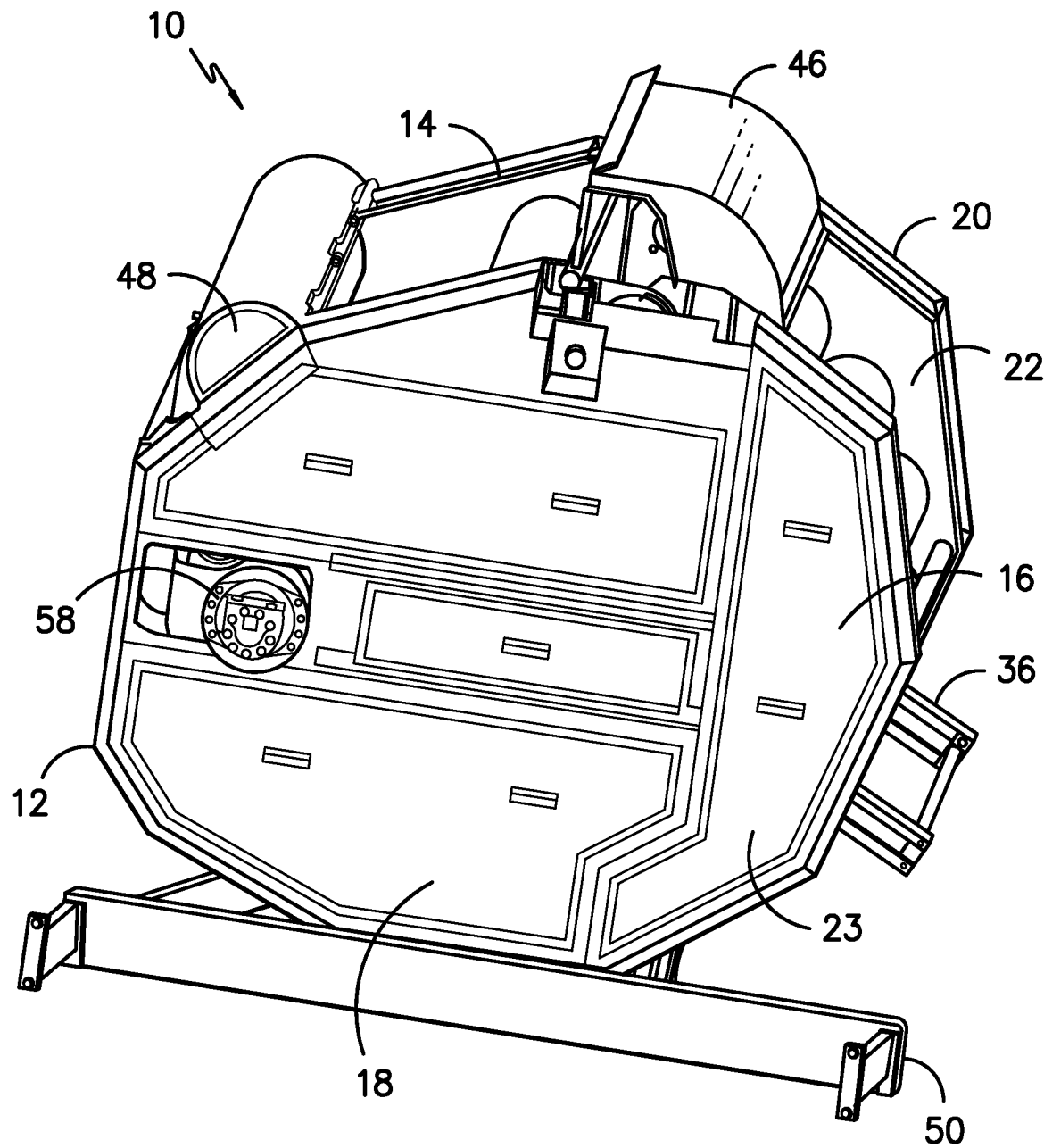
FIG. -1-

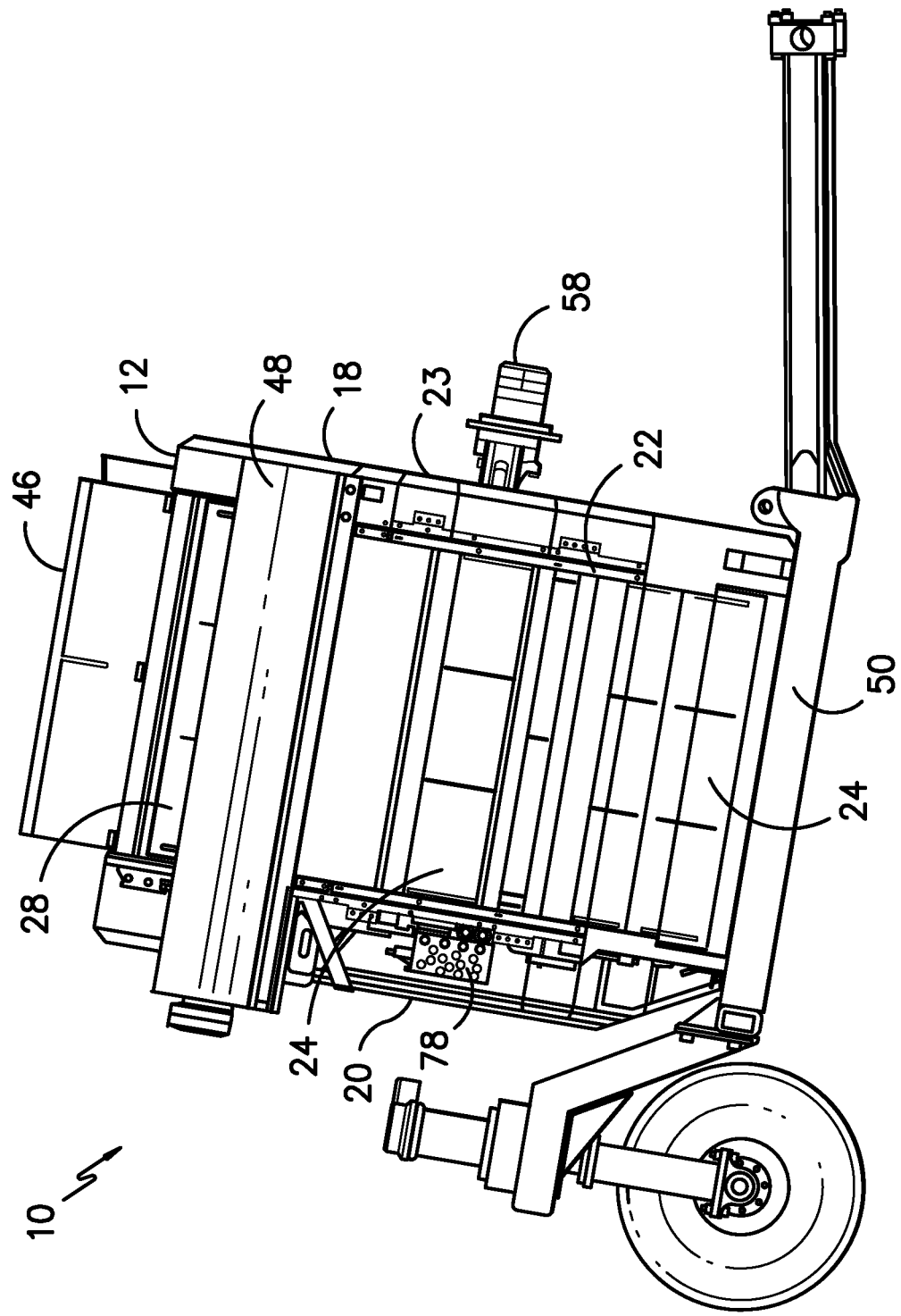
FIG. -2-

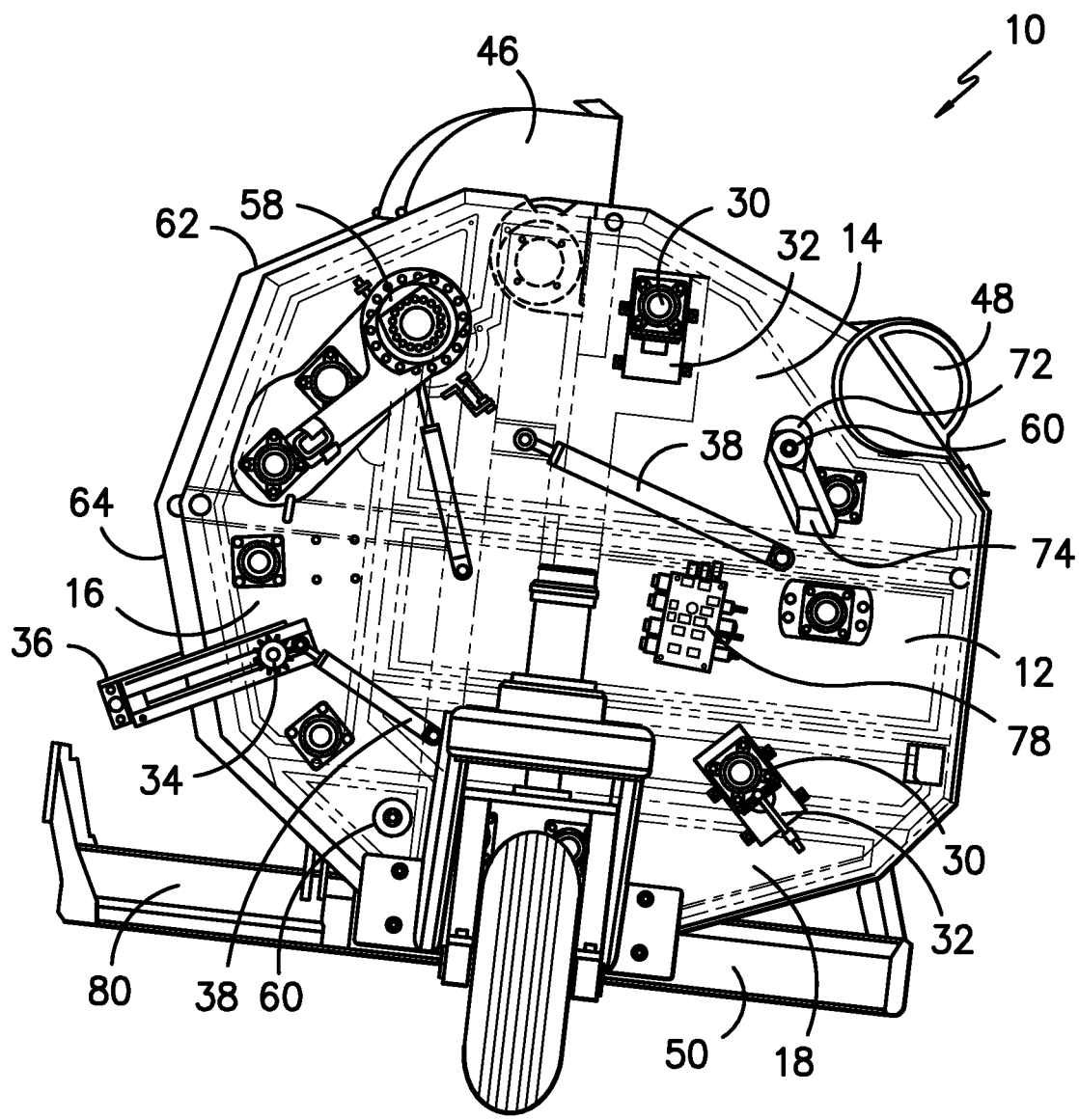
FIG. -3-

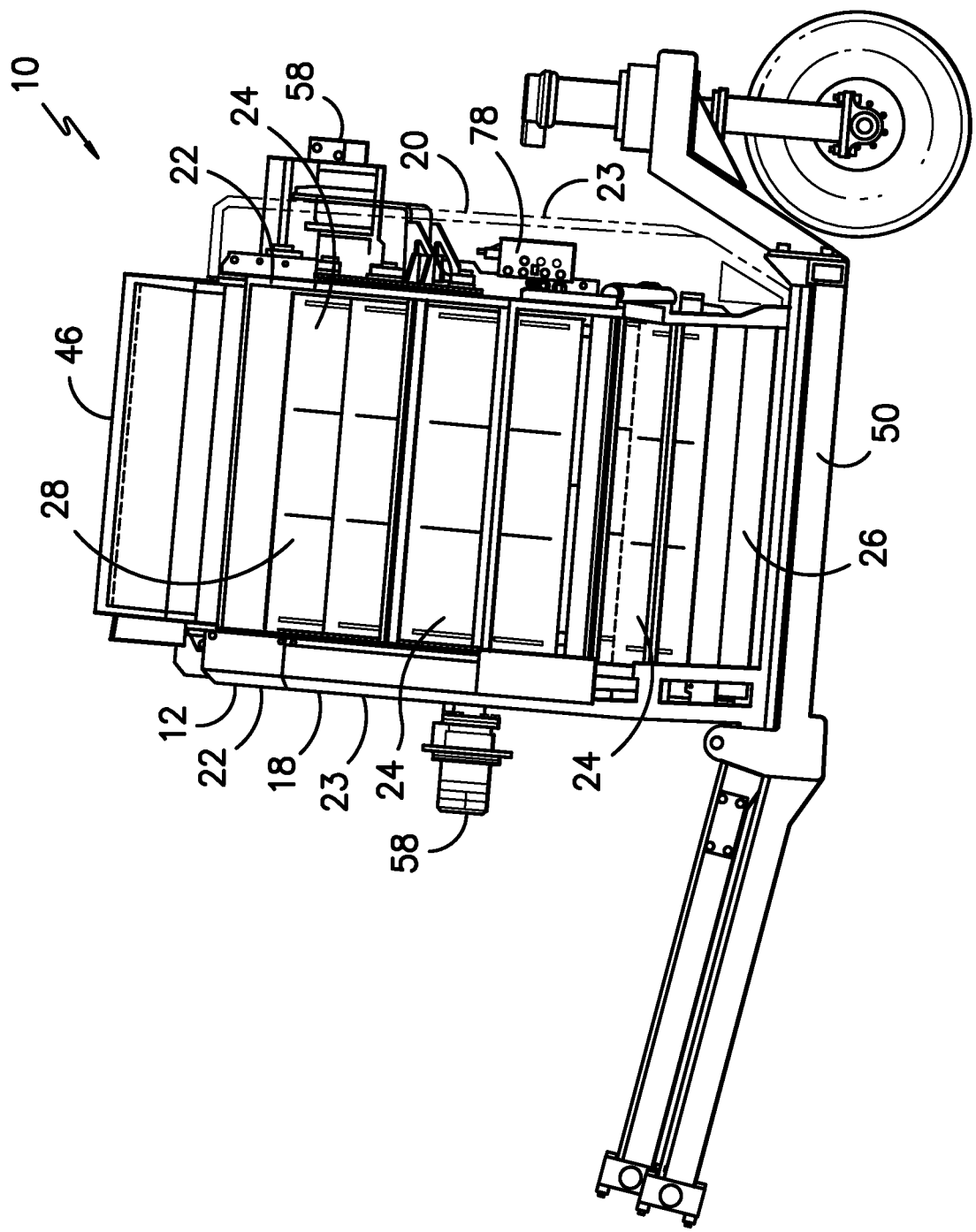
FIG. -4-

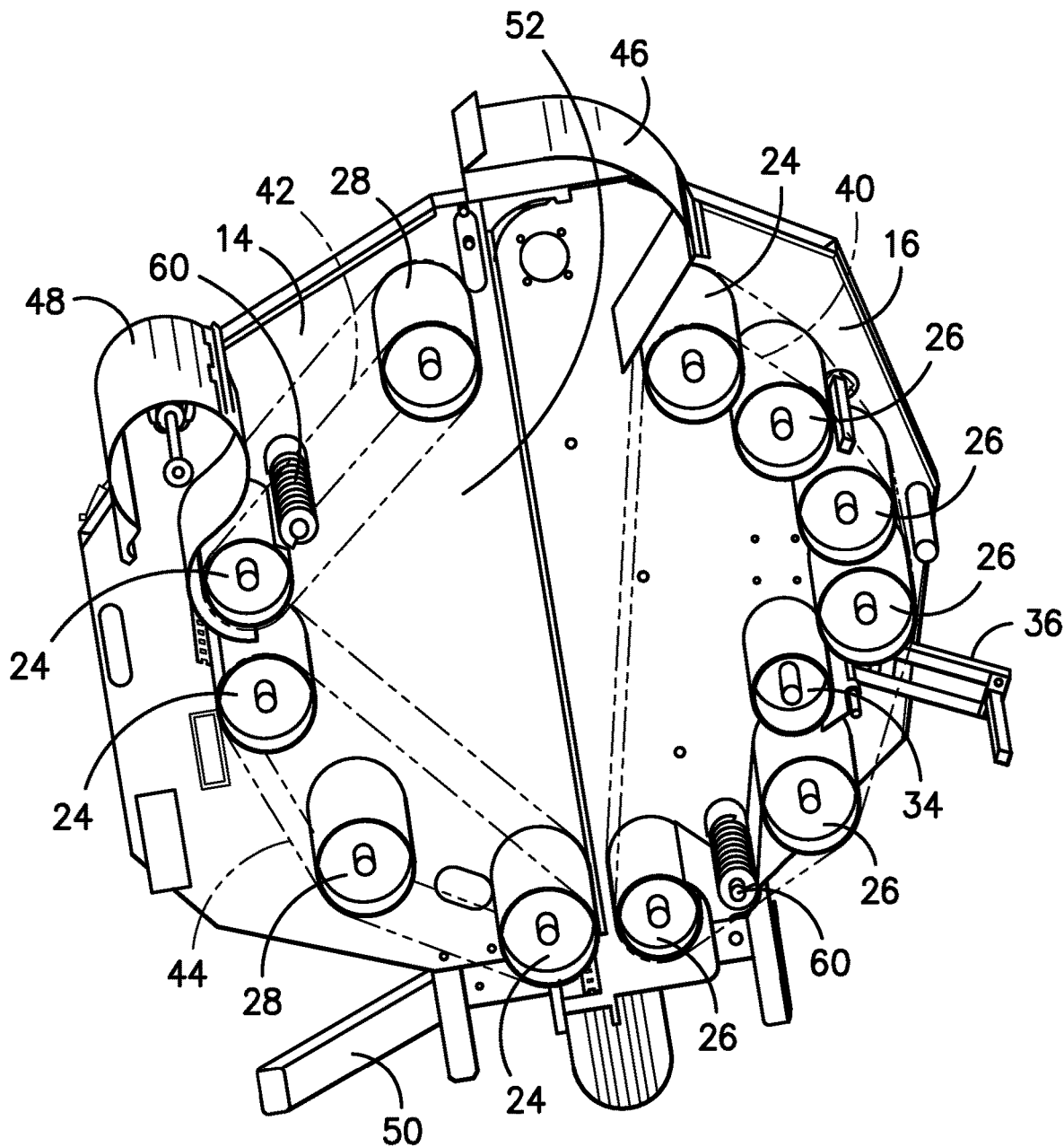
FIG. -5-

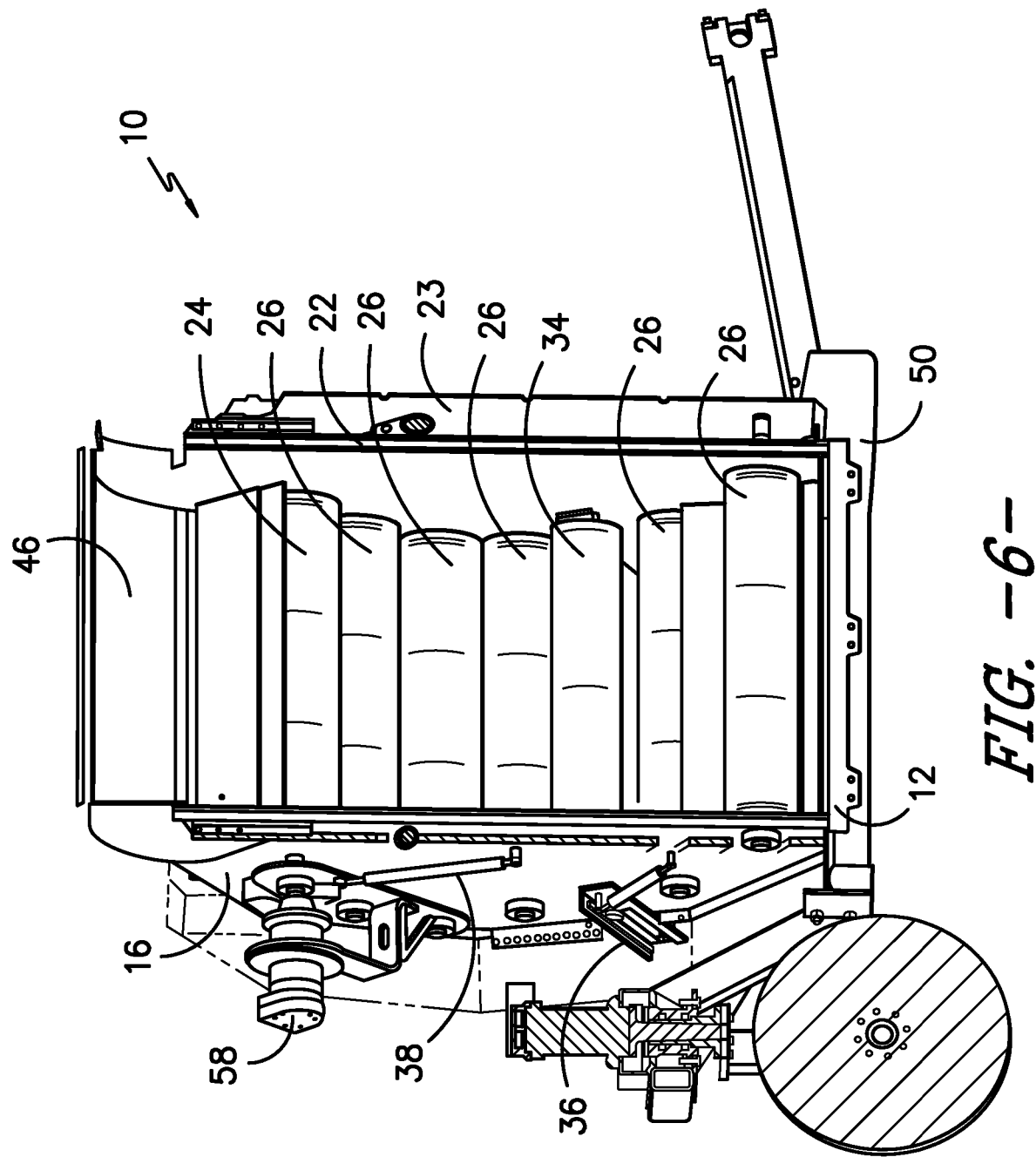

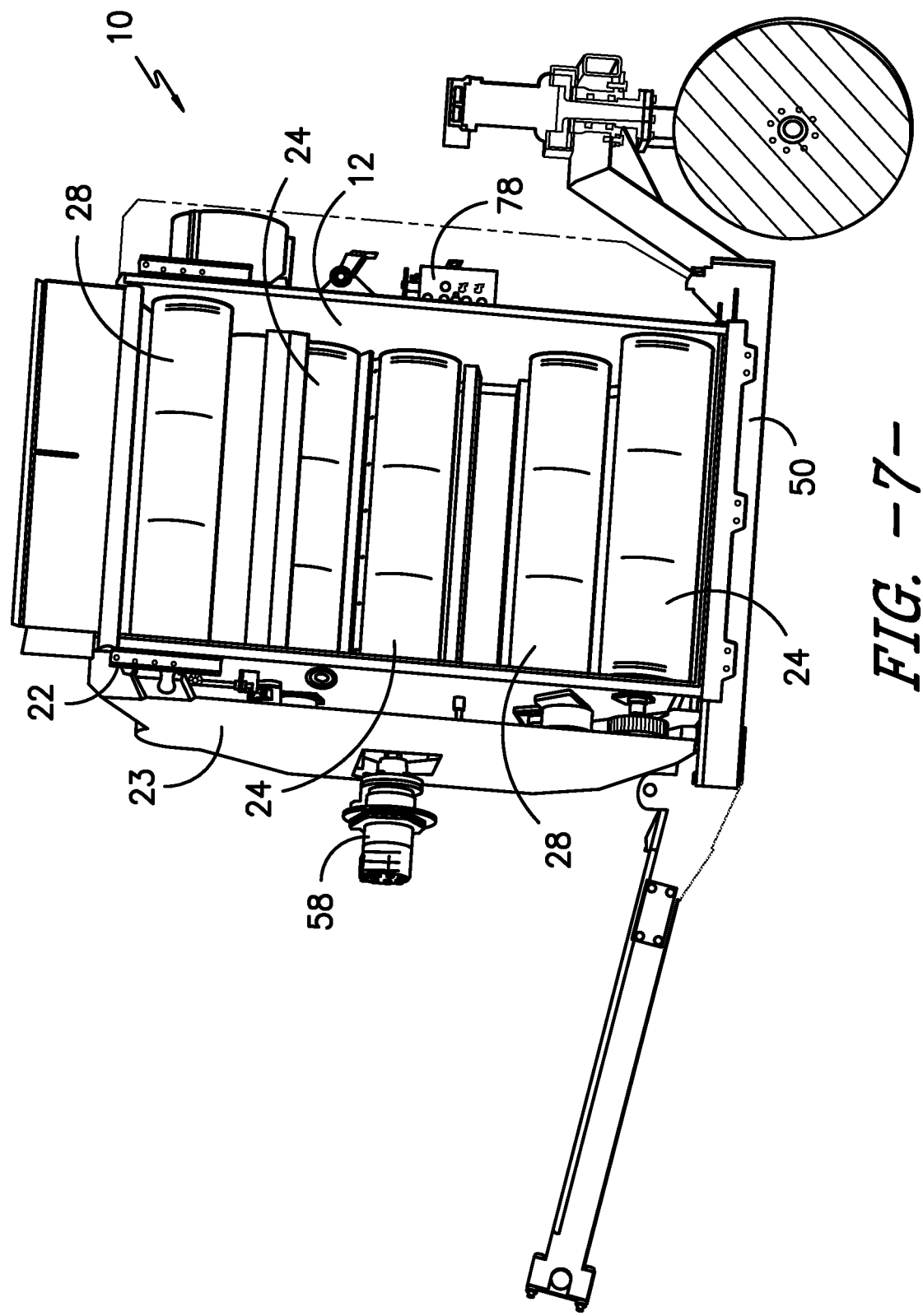
FIG. -7-

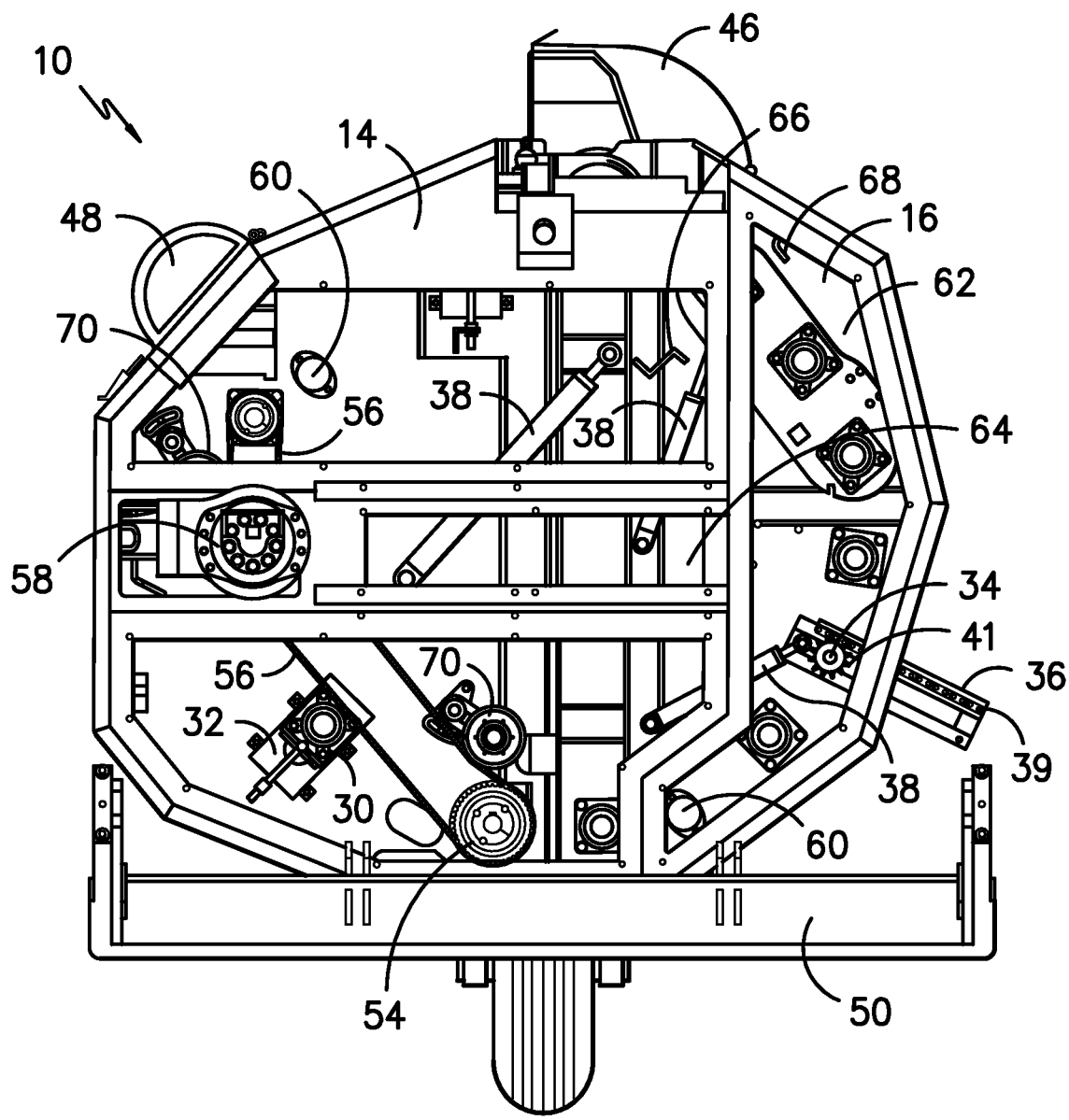
FIG. -8a-

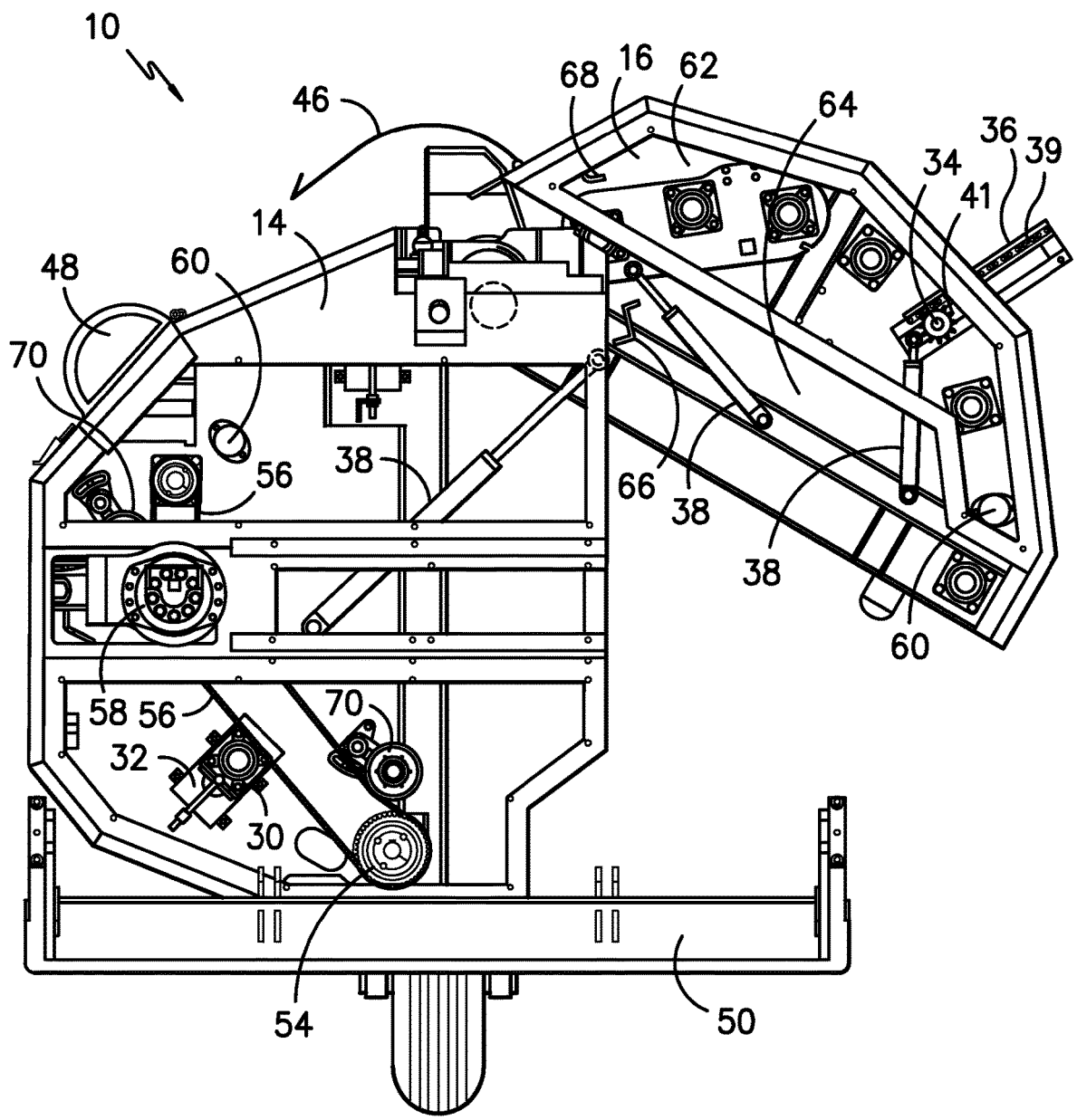
FIG. -8b-

BALING APPARATUS AND METHOD

BACKGROUND OF THE INVENTION

The present invention generally relates to an apparatus and method for baling loose material. More specifically, the present invention relates to an apparatus that receives a steady flow of loose material, such as mulch, trash, or the like, compresses the loose material into a bale, and then wraps the bale with material to hold the bale together for transport and storage purposes.

A baler is a piece of farm machinery used to compress a cut and raked crop (such as hay, cotton, straw, or silage) into compact bales that are easy to handle, transport, and store. Several different types of balers are commonly used, each producing a different type of bale—rectangular or cylindrical, of various sizes, bound with twine, strapping, netting, or wire. Industrial balers are also used in material recycling facilities, primarily for baling metal, plastic, or paper for transport.

The most common type of baler in industrialized countries today is the large round baler. It produces cylinder-shaped "round" or "rolled" bales. The design has a "thatched roof" effect that withstands weather well. Grass is rolled up inside the baler using rubberized belts, fixed rollers, or a combination of the two. When the bale reaches a predetermined size, either netting or twine is wrapped around it to hold its shape. The back of the baler swings open, and the bale is discharged. The bales are complete at this stage, but they may also be wrapped in plastic sheeting by a bale wrapper, either to keep hay dry when stored outside or convert damp grass into silage.

Heretofore, baling was primarily used in connection with hay, cotton, straw, or other types of fibrous materials. It has been contemplated that baling other types of materials, such as dirt, mulch, and household garbage, for instance, would be beneficial, because those materials could be compressed into much smaller units that would occupy significantly smaller volumes than the loose materials that remain uncompressed. One problem, however, with baling dirt and mulch (for example), is the difficulty in compressing that material to form into a bale, and then ensuring that the bale would remain intact, rather than simply falling apart. Hay, cotton, and straw bales tend to remain intact after the baling operation has been completed, largely due to the length and fibrous nature of those materials. Dirt and mulch, which includes much smaller particulate, would simply crumble out of the sides of the bale during the baling process, and thus, balers for these types of materials have never been successfully manufactured and commercialized.

It would be particularly advantageous to provide a baler and method for baling other types of materials, and particularly non-fibrous materials that have, heretofore, been difficult to form into bales. The advantages of baling these and other materials include the ability to transport the bales, stack the bales for efficient storage, and compressing the materials into a volume that is much smaller than the volume of the uncompressed material.

Additionally, such a baler could be attached to other types of equipment, such as a mulching machine that creates mulch from trees, brush, and the like, as set forth in U.S. Patent Application Publication No. US 2011/0290921, which is hereby incorporated herein by reference. It is contemplated that a baler could be incorporated into a brush cutter/mulching machine, so that the mulcher would be capable of creating the mulch and feeding the mulch directly into the baler for baling.

Another useful technique would be to combine a baler with a trash or refuse collecting truck in order to compress and bale household or commercial trash. In such an arrangement, the trash workers could load trash directly into a feeder for the baler for compression and baling. When the bale reaches capacity and is released from the baler, the bale of trash could be stacked onto a flatbed of a truck, and additional bales could be stacked on top of one another in a compressed state, which means that such a truck could transport vastly larger quantities of trash than currently available methods allow. When the trash bales are delivered to a landfill, the bales could be neatly stacked, creating a much cleaner appearance, with the added benefit that the bales only occupy approximately 10% of the volume of uncompressed, loose trash and refuse. Thus, in this way, a landfill having a certain land area could contain as much as ten times the amount of trash dumped there in an uncompressed, loose manner as is typical of landfills in use today.

SUMMARY OF THE INVENTION

The instant baling apparatus, in a preferred embodiment, includes a housing having a fixed portion and a movable portion (or "door") pivoting upward and outward in relation to the fixed portion, wherein the door may pivot between an open and closed position. A series of rollers are arranged about the periphery of the housing, on an inner portion thereof, in a generally circular configuration. A series of large, flexible bands or belts are positioned within the housing, extending almost the entire width of the inside of the housing, and engage the rollers during the baling operation. The apparatus includes a hopper for feeding material to be baled ("bale material") into the baler, and specifically for feeding the bale material to the inside area of the housing between the belts.

In a preferred embodiment, several of the rollers positioned on the fixed portion of the housing include three rollers that are driven by a hydraulic motor (either directly, or indirectly via a pulley mechanism), along with two adjustable rollers that are slidably mounted so that they may move inwardly or outwardly with respect to the housing for purposes of belt replacement. On the door side of the housing, the rollers preferably include a driven roller, six fixed rollers, together with a movable tensioner roller. The tensioner roller is mounted on a mechanism that includes a pair of tracks extending outwardly from the door, so that the tensioner can move inwardly and outwardly along the tracks. The tensioner roll is used to push against the belt inwardly during the baling operation to apply compression forces onto the outer side of the belt, which serves to compress the baling material into an extremely tight configuration, so that the bale can maintain its structural integrity after it has been wrapped and released from the baler. The tensioner roll mechanism is driven inwardly and outwardly by a hydraulic piston. A pair of rotating auger members are disposed within the housing toward the outer periphery thereof, and are used to catch and remove any errant chips or pieces of bale material that fall between the belts and the housing, in order to prevent any such chips or pieces from interfering with the mechanical components of the baler. The chips are caught up in the rotating helical screw blade and transported to an exit port in the side of the housing where they are ejected therefrom.

In operation, the bale material is fed through the hopper, and the hydraulic motors drive the belts that are positioned on the rollers in the baling cavity of the housing. The tensioner roller moves inwardly to apply a compressive force against the belt and the bale material disposed within the baling cavity. A sensor apparatus monitors the bale size to determine when the bale is nearing and has reached its maximum capacity. When the bale has reached its maximum capacity, a wrap feeder begins to feed a wrap (preferably a strong netting material) around the bale through several revolutions under high tension, in order to hold the bale together. Once the wrapping operation is completed, the wrap material is cut or broken, and the door opens to release the bale from the baler. At this point, the operation may start over again in order to create the next bale.

BRIEF DESCRIPTION OF THE DRAWINGS

These and other features, aspects, and advantages of the present invention will become better understood with regard to the following description, appended claims, and accompanying drawings where:

FIG. 1 is a perspective view of a baling apparatus in accordance with one aspect of the present invention;

FIG. 2 is side view of a baling apparatus in accordance with one aspect of the present invention;

FIG. 3 is a rear view of a baling apparatus in accordance with one aspect of the present invention;

FIG. 4 is a side view of a baling apparatus in accordance with one aspect of the present invention;

FIG. 5 is a cross-sectional view of a baling apparatus in accordance with one aspect of the present invention, illustrating the arrangement of rollers and augers within the housing;

FIG. 6 is a cross-section view of a baling apparatus in accordance with one aspect of the present invention, illustrating the arrangement of rollers positioned within the housing on the pivoting door side thereof;

FIG. 7 is a cross-section view of a baling apparatus in accordance with one aspect of the present invention, illustrating the arrangement of rollers positioned within the housing on the on the fixed side thereof;

FIG. 8a is a cutaway front view of a baling apparatus in accordance with one aspect of the present invention, wherein the outer wall of the housing has been cut away to reveal the components positioned between the outer wall and the inner wall of the housing on the front side thereof: and FIG. 8b is a cutaway front view of a baling apparatus in accordance with one aspect of the present invention, wherein the outer wall of the housing has been cut away to reveal the components positioned between the outer wall and the inner wall of the housing on the front side thereof, and the hinged door is shown in an open position.

DETAILED DESCRIPTION OF THE INVENTION

Overview

One preferred embodiment of a baling apparatus 10 (also referred to herein as a "baler") is illustrated in FIGS. 1-8. A housing 12 includes a fixed member 14 and a pivoting door member 16. The front 18 and rear sides 20 of the housing 12 preferably include an inner wall 22 and an outer wall 23. A series of rollers (24,26,28,34) are disposed about the inner periphery of the inner wall 22 of the housing 12 in a generally circular configuration. A series of belts (40,42,44) are disposed about the rollers within the inner walls 22 of the housing 12. A hopper 46 is positioned on the top of the housing 12, and is used to screen and feed bale material into the baler 10. A wrap feeder 48 is positioned on an outer portion of the housing 12, and holds a roll of wrap material, preferably in the form of a strong netting material, which may be fed into the baler 10 and wrapped around the bale once the bale has been formed and compressed.

Housing

Preferably, the housing 12 is comprised of a fixed member 14 and a door member 16 that may pivot upward and outward as shown in FIG. 8b. In one embodiment, the housing 12 includes front 18 and rear 20 frame members that are spaced apart and occupy parallel planes. The frame members (18,20) are connected by various components, including support members, rollers, and a base 50. Each frame member (18,20), in a preferred embodiment, includes two separate walls—an inner wall 22 and an outer wall 23. Rollers (24,26,28,34) are situated between the frame members (18,20), and a baling cavity 52 is defined between the frame members (18,20), and the rollers extend about a periphery of the housing 12 in a generally circular configuration between the inner walls 22 of the frame members (18,20). The outer wall 23 is spaced apart from the inner wall 22 on each frame member, creating a defined and enclosed space for various components, including hydraulic pistons 38 and components, pulleys 54, drive belts 56, and the like. This arrangement allows these components to be separated from the baling cavity 52, and further, to be isolated between the inner 22 and outer walls 23, which protects them from outside elements, including water, dust, dirt, and the like. An additional benefit to this configuration is that sections of the outer wall 23 may be removed for repair and maintenance purposes.

The housing 12 may be mounted to any type of frame or platform, as desired, and the baler may be used as an individual single unit, or may be incorporated into other types of equipment or systems, including, for example, brush cutter/mulchers or trash removal trucks or equipment.

Rollers

There are a variety of different rollers (24,26,28,34) disposed within the inner walls 22 of the housing 12 that are used in the baling process. In a preferred embodiment, some of the rollers are disposed in a fixed position with respect to the housing, and are rotationally driven by a hydraulic motor 58 (either directly, or are driven indirectly via a belt or chain drive mechanism). These rollers are referred to herein as "driven rollers" 24. A second set of rollers 26 is fixed to the housing 12 (not adjustable, not driven), and these rollers are referred to herein as "fixed rollers" 26. The fixed rollers 26 simply rotate in correspondence with the belt (40,42,44) that engages them, due to frictional engagement with the belt. A third set of rollers 28 is adjustable with respect to the housing 12, so that they may slide inwardly toward a central portion of the housing 12, thus loosening the belt; or outwardly toward a perimeter thereof, thus tightening the belt, and these rollers are referred to herein as "adjustable rollers" 28. The adjustable rollers 28 are actually fixed during the baling operation, so for operational purposes, the adjustable rollers 28 behave in the same manner as the fixed rollers 26. The adjustable rollers 28 are mounted to a slide mechanism 30 that is received into slots 32 in the housing 12, as shown, so that the slide mechanism 30 may be moved between an operational position (creating higher tension on the engaged belt) and a maintenance position (relaxing tension on the engaged belt), and secured into either position. A means for adjustment is provided on these adjustable rollers 28 for maintenance purposes, simply to facilitate removal and reattachment of the belts that engage those rollers 28 when maintenance needs to be performed.

Lastly, a tensioner roll 34 is used to push the belt against the bale material during the baling operation. The tensioner roll 34 is mounted onto a track 36, as shown, and a hydraulic motor is used to push the tensioner roll 34 inwardly along the track 36 and against the belt 40 from the outside of the belt 40 (from within the belt "loop") via a hydraulic piston 38, as shown, in order to apply significant compression forces to the bale material during the baling operation. The tensioner roll 34 is not driven in a rotational manner in a preferred embodiment, but instead is simply forced against the belt inwardly as described above. The track 36 includes a chain mechanism 39 that engages with a gear 41 that is disposed on the outer part of the tensioner roll 34 axis. As the tensioner roll 34 is moved inwardly and outwardly along the tracks, the gear 41 and chain 39 assembly ensure that both sides of the tensioner roll 34 remain evenly positioned between the tracks, which helps to keep uniform pressure against the belt and baling material. Additionally, this gear and chain mechanism helps to provide a smoothly shaped, symmetrical bale, rather than a lumpy, irregularly shaped bale. This same gear and chain mechanism may also be applied to and incorporated in the hinged portion 62 of the door 16, discussed below, in order to provide uniform compression on each side of the bale during a baling operation.

Optionally, the rollers (24,26,28) may include a small notch on a side thereof, for expelling small bale material chips that become lodged between the circular side of the roller and the inner wall 22 of the housing 12. The concept is that the chip, which is pinched between the side of the roller and the wall 22, will fall into the notch during rotation of the roller, and then fall out when that portion of the roller disengages from the belt during normal rotation. Then, the chip can be expelled from the housing by the auger mechanisms 60.

Belts

A series of large, flexible belts (40,42,44) are used to rotate, compress and form the bales from the bale material. Each of these belts (40,42,44) engage and wrap around a specific set of rollers (24,26,28,34) within the inner walls 22 of the housing, so that the driven rollers 24 rotationally drive the belts, and the fixed rollers 26 and adjustable rollers 28 guide the belts. When a belt needs to be replaced, the adjustable rollers 28 are moved into maintenance position, thus loosening and reducing tension on the belt to facilitate removal of the belt from the rollers. When a new belt is properly positioned around the rollers, the adjustable roller 28 is then moved back into its operational position, which may provide tension to the belt, and then the adjustable roller 28 is tightened and secured into that operational posture.

In a preferred embodiment, three separate belts are used within the baler. One belt 40 extends around all of the rollers that are positioned on the door side of the housing ("door belt" 40). The top roller 24 that engages the door belt 40 is driven directly by a hydraulic motor 58, which is mounted on the side of the housing 12. The remaining rollers (26) on the door side of the housing that engage the door belt 40 are fixed rollers, with the exception of the tensioner roller 34. The upper portion of the inner wall 22 of the housing on the door side includes a hinged portion 62 that allows the upper three rollers to move upwardly and downwardly in concert with one another. A hydraulic piston 38 is disposed between the hinged portion 62 of the door housing 16 on the inner wall 22 and a fixed portion 64 of the door housing 16 on an inner wall 22, as shown. The hydraulic piston 38 exerts a closing or compression force on the hinged portion 62 of the door housing 16, and during the baling operation, as the bale grows larger, the hinged portion 62 is forced upwardly by the increasing size of the bale. This arrangement helps to provide compression forces to the bale material during the baling operation. A pair of contact sensors (66,68) engage the hinged portion 62 of the housing to determine 1) when the bale is nearing maximum capacity but has not yet reached maximum capacity, and 2) when the bale has reached maximum capacity. The sensor system will be discussed in more detail hereinbelow.

On the fixed side 14 of the housing 12, in a preferred embodiment, an upper belt 42 engages the rollers on the upper side of the housing 12, while a lower belt 44 engages the rollers on the lower side of the housing 12, as shown. The upper belt 42 is rotated by a driven roller 24 having an axle that extends outwardly through the inner wall 22 of the housing 12, which engages a drive belt 56 attached to a hydraulic motor 58. A belt tensioner 70, mounted on the outer portion of the inner wall 22, engages the drive belt 56 that runs between the hydraulic motor 58 and the driven roller 24, in order to maintain tension on the drive belt 56. The top roller 28 on the fixed side 14 of the housing 12 is an adjustable roller 28, while the remaining roller(s) engaged by the top belt 42 are preferably fixed rollers 26.

A lower belt 44 engages the rollers disposed on the lower side of the fixed portion 14 of the housing 12. The top roller 24 that engages the lower belt 44 is directly driven by a hydraulic motor 58 that is disposed between the inner wall 22 and the outer wall 23 of the housing 12, as shown. The bottom roller 24 that engages the lower belt 44 is indirectly driven by the hydraulic motor 58 via a drive belt 56 extending therebetween, which is also positioned between the inner 22 and outer walls 23 of the housing 12. A belt tensioner 70 engages the drive belt 56 between the hydraulic motor 58 and the bottom driven roller 24, as shown.

Overall, the belts (40,42,44) are positioned so that they are each in close proximity to one another, such as in the lower portions of the baling cavity 52 (where the bale is formed within the housing 12), except for a gap between the door belt 40 and the upper belt 42. This gap in the top of the baling cavity 52 is adjacent to the hopper 46, and allows baling material to be fed by the hopper 46, through the gap, and into the baling cavity 52. This arrangement allows baling material to be fed into the baling cavity 52 without having significant amounts of the baling material fall through any small cracks or gaps between the belts in the lower portion of the housing.

Auger System

Inevitably, during the baling operation, some small pieces, chips or particles of the baling material may fall into cracks and crevices within the housing, for instance, between the belts and the inner wall of the housing, and landing outside of the baling cavity 52 but remaining within the housing 12. A system is provided to remove these small pieces of baling material from the housing 12, so that they do not interfere with the operational components of the baler 10. In one embodiment, a pair of hydraulically driven augers 60 are positioned in parallel relation to the rollers (24,26, 28,34) within the belts (40,42,44), near an outer periphery of the inner walls 22 of the housing 12, as shown. These augers 60 are rotated and directly driven by hydraulic motors 58 during the baling operation. During use, the chips are caught up in the rotating helical screw blade and transported to an exit port 72 in the side of the housing 12 where they are ejected therefrom. Optionally, a chute 74 may be mounted on an outer portion of the housing 12 adjacent the exit port 72 to direct the flow of ejected chips.

Additionally, a small amount of baling material will fall between the small gap between the bottom of the door belt 40 and the lower belt 44 on the fixed side 14 of the housing 12. To address this issue, a small enclosure is placed below the gap to catch the baling material that falls therethrough. When the enclosure is full of baling material, then the baling material within the enclosure acts as a stopper, preventing any additional baling material from falling between the gap. The enclosure empties out when the bale is released from the baler, and tends to refill during every baling cycle.

Sensor System

A series of sensors are used to monitor the progress and functional aspects of the baling operation in progress. Contact sensors (66,68) are used to monitor the size of the bale within the baling cavity as shown in FIG. 8a. A preliminary contact sensor 66 is attached to the housing on the door 16 adjacent to the hinged portion 62, and senses when the hinged portion 62 begins to "open," or move upwardly and outwardly due to the size of the bale. This preliminary contact sensor 66 is used to tell the operator that the bale is nearing its maximum capacity, but has not yet reached maximum capacity. A final contact sensor 68 is mounted above the hinged portion 62 of the housing 12 on the door 14, and provides an alert signal when the hinged portion 62 has extended outwardly far enough to indicate that the bale has reached its maximum capacity. The final contact sensor 68 alert is used to initiate the wrapping process, whereby the wrap feeder 48 engages and begins to wrap the bale in the final step before the bale is released from the baler 10. A door contact sensor is disposed at a point between the fixed housing 14 and the door 16, to indicate whether the door 16 is opened or closed.

There is also a sensor operatively connected to the tensioner roll 34, in order to monitor and control the amount of force the tensioner roll 34 is exerting against the belt 40 and the baling material. The computer is programmed to provide systematically increasing pressure on the belt 40 and baling material as the baling operation progresses, so that the maximum pressure is exerted by the tensioner roll toward the end of the baling cycle when the bale is reaching maximum capacity. During operation, the computer controls the amount of pressure applied by the tensioner roll 34, and preferably provides intermittent, cyclical pressure, so that the tensioner roll applies high pressure, then backs off and releases some pressure, and then reapplies significant pressure, all in a continuous cycle.

These sensors are all operatively connected to a computer system, which not only displays the information gleaned from the sensors on a display for the operator's information, but also for use in triggering and controlling other actions by the baler (or baler components) during the baling operation.

Computer/Display

In a preferred embodiment, a computer is operationally connected to various components of the baler in order to monitor and control different aspects of the baling operation. Preferably, a touch screen display is used as an interface between the operator and the baler, so that the operator can control and monitor many aspects of the baling operation. For instance, the computer is used to monitor the signals from the various sensors, as described above. This information is preferably displayed on the display screen as information to the operator.

Further, in a preferred embodiment, the computer is used to automate and control many aspects of the baling operation. For instance, when the computer receives a signal from the preliminary contact sensor 66, it activates an alert signal for the operator to let him or her know that the bale is nearing maximum capacity. The operator may then begin to maneuver the baler 10 to a convenient place where the bale may be released, thus increasing time efficiency. When the final sensor indicates that the bale has reached maximum capacity, the computer automatically actuates the wrap feeder 48, so that the wrap material begins feeding into the baling cavity 52 to wrap the bale prior to releasing the bale from the baler 10. The computer also monitors the pressure forces on the bales, the operation of the hydraulic motors 58, the hydraulic distribution valve 78, the hydraulic low pressure sensing pump, the actuation and speed of the wrap feeder 48 (for tension), and other parameters and systems, to ensure proper and safe operation. Certain events or warning signals received by the computer from sensors may act as a trigger to shut down the baling operation for safety reasons, in order to prevent additional damage to the baler or its components due to a malfunction or improper use.

It should be understood that while a touch screen is the preferred display and interface, other types of displays or controls may be used. Further, the display and/or controls may be located in any desired position or location, whether attached directly to the housing of the baler, or remotely (in the cab of a brush cutter/mulcher that is connected to a baler, for instance.)

Hydraulic System

The majority of the moving components of the baler 10 are driven by the hydraulic system, which includes hydraulic motors 58 for rotating the driven rollers 24, and hydraulic pistons 38 for opening and closing the door 16 and for providing compression forces to the tensioner roll 34 and the hinged portion 62 of the housing 12 on the door side 16. A hydraulic distribution valve 78 ("body valve") is used to distribute the hydraulic forces to the various hydraulic components, and is mounted on the side of the housing 12 between the inner 22 and outer walls 23. A hydraulic motor 58 also powers the wrap feeder 48, and small hydraulic motors 58 drive the augers 60.

The hydraulic motors 58 are preferably driven by a standard hydraulic pump, which may be directly attached to the baler 10, or which may be attached to and powered by another piece of equipment used in conjunction with the baler (such as a brush cutter/mulcher as previously mentioned).

The other hydraulic components are driven by a low pressure sensing pump, which is connected to the body valve 78. The body valve 78 works as a distribution valve, sending hydraulic fluid under pressure to the desired component at the desired time, and it is also capable of monitoring pressure levels, acting as a sensor in that way. The low pressure sensing pump and body valve 78 are operatively connected to the computer system, which is programmed to control the body valve 78 and to receive information (including pressure levels, etc.) for monitoring and safety purposes.

Operation

During a baling operation, in a preferred embodiment, means are provided for feeding baling material into the hopper 46 in a continuous fashion. For instance, a conveyor system may be set up to transport bale material along the conveyor and into the hopper 46. In another embodiment where the baler 10 is attached to a brush cutter/mulcher, the mulch may be blown through a chute or channel into the hopper 46 in continuous fashion.

As the bale material is fed through the hopper 46 and into the baling cavity 52, the hydraulic motors 58 are rotating the driven rollers 24, which, in turn, rotate the upper 42 and lower belts 44. The rotation of the upper 42 and lower belts 44 then cause the fixed rollers 26 to rotate. Typically, in an empty baling cavity 52, the upper 42 and lower belts 44 will rotate due to frictional engagement between the belts and the driven rollers 24. On the door side 16, usually the belt 40 will not begin to rotate until the volume of bale material has reached the point where it forces the belt 40 against the driven roller 24, because in an empty baler, the door belt 40 hangs loosely on the rollers. As discussed previously, the adjustable rollers 28 on the door side 16 operate as fixed rollers during the bailing process; therefore, the rotation of the belt 40 on the door side 16 results in the rotation of the adjustable rollers 28.

When the baling material has reached the "critical mass" to engage all of the belts (40,42,44), then all of the belts rotate the bale material in a clockwise manner, and the tensioner roll 34 begins the process of applying pressure inwardly on the belt 40 and the baling material. The belts, in a preferred embodiment, all rotate at the same speed and in the same direction during the baling operation, and the computer monitors and controls the hydraulic motors 58 to ensure proper speed for each motor and belt.

During the baling operation, the auger members 60 are constantly rotating, transporting errant chips and pieces of the baling material that have inadvertently escaped the baling cavity 52 from the housing 12.

As previously mentioned, when the preliminary contact sensor 66 indicates that the bale is nearing maximum capacity, a signal is sent to the operator so that the baler 10 may be maneuvered to a convenient location to release the bale. When the bale has reached maximum capacity, the final contact sensor 68 signals the wrap feeder and actuates the wrap feeder 48 to begin feeding the wrap around the bale.

The wrap feeder 48 may also be controlled by the computer. The wrap feeder 48 is preferably positioned on the fixed side 14 of the housing 12, as shown, and includes a mounted roll of wrap material. This material is fed through a slot in the housing 12 between the upper 42 and lower belts 44 and into the bailing cavity 52, thereby coming into contact with the outer periphery of the bale material. As the belts turn the bale material within the baling cavity 52, the wrap material is fed into the cavity, wrapping around the baling material in the process. The wrap feeder 48 is directly driven by a hydraulic motor 58, and the computer controls the motor speed so that the wrap is fed into the baling cavity 52 at a slightly slower pace than the belts (40,42,44) that rotate the bale material. In this way, the wrap material is under significant tension as it wraps around the bale material, providing additional compressive forces on the bale during the wrapping operation. After the wrap has revolved around the bale several times (preferably 2-3 times, although more revolutions may be employed, as desired), the computer stops the wrap feeder 48 from feeding any additional wrap material into the baling cavity 52, and the wrap material (preferably high-strength polymeric netting) simply snaps, and the bale wrap separates from the wrap material positioned within the wrap feeder 48.

Once the wrapping operation is complete, then the operator may open the door 16 of the housing 12 to release the wrapped bale. The door 16 is controlled by a hydraulic piston 38, which is attached between the door 16 and the fixed housing 14 between the inner 22 and outer walls 23 of the housing 12. In one embodiment, a bale release platform 80 may be positioned below the door 16 to catch the released bale and prevent it from an uncontrolled release. The bales may weigh as much as a ton or more, and the bale release platform 80 facilitates a safe and controlled release of the bale from the baler.

Platform

It should be understood that the baler presented herein is capable of being attached to any number of platforms or frames. In one embodiment, the baler may be placed on a dedicated platform that includes a wheel or multiple wheels, so that it may be towed like a trailer behind any large mobile vehicle or piece of equipment, such as a truck, tractor, or the like. The baler may also be mounted to the bed of a large flat-bed truck. Further, the baler may be attached to or incorporated with another vehicle or piece of equipment, such as the aforementioned brush-cutter/mulcher, or incorporated into a trash truck. In essence, the baler may be used by itself as a single unit, or in combination with other heavy equipment in many different configurations, as desired.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A baling apparatus comprising:
   a housing having a fixed member having a vertical edge and a pivoting door member having a vertical edge that abuts said vertical edge of said fixed member when said pivoting door is in a closed position, and wherein a bale is gravity ejected when said pivoting door is in an open position, said housing including a baling cavity on an inside portion thereof;
   a series of rotatable rollers positioned within said housing, said rollers being disposed in a generally circular or round configuration and being disposed in generally parallel relation to one another so that said baling cavity is formed within said generally circular configuration of said rollers, and wherein a first set of said rollers are rotatably attached within said fixed member of said housing, and a second set of said rollers are rotatably attached within said pivoting door member of said housing;
   a series of belts disposed about said rollers with each roller in contact with a belt, so that said belts may rotate about said rollers, wherein a first belt is disposed about multiple said rollers positioned within said fixed member of said housing, and a second belt is disposed about multiple said rollers positioned within said pivoting door member of said housing, and an inner portion of each belt defines a boundary of said baling cavity so that said baling cavity is generally surrounded by said inner portions of said belts;
   a drive mechanism attached to said housing and operatively connected to at least one of said rollers, wherein said drive mechanism rotates said roller that is operatively connected thereto;
   a hopper attached to an upper portion of said housing for receiving baling material; wherein said baling material is fed through said hopper into said baling cavity; and
   a wrap feeder disposed on an outer portion of said housing, said wrap feeder being used to feed a wrap material into said baling cavity to wrap around a bale of baling material after said bale has been formed therein.

2. The baling apparatus set forth in claim 1, wherein at least two belts are disposed about said rollers disposed in said fixed member of said housing.

3. The baling apparatus set forth in claim 1, further including a tensioner roll disposed within said housing, said tensioner roll being attached to a sliding mechanism that allows said tensioner roll to be slid inwardly toward said baling cavity and outwardly toward an outer portion of said housing.

4. The baling apparatus set forth in claim 3, further including means for forcing said tensioner roll to move inwardly toward said baling cavity in order to provide a compressive force on a bale therein.

5. The baling apparatus set forth in claim 1, wherein at least one roller of said second set of said rollers rotatably attached within said pivoting door member of said housing is adjustable, so that said adjustable roller may be moved inwardly toward said baling cavity, or may be moved outwardly away from said baling cavity, in order to reduce or increase tension on said belt that is operatively connected to said adjustable roller.

6. The baling apparatus set forth in claim 1, further including at least one hydraulic motor attached to said housing, wherein said hydraulic motor is operatively connected to a component selected from the group consisting of at least one of said rollers, a hydraulic piston attached to tensioner roll, and a hydraulic piston attached to said housing for opening and closing said door member of said housing.

7. The baling apparatus set forth in claim 6, further including a hydraulic distribution valve operatively connected to said hydraulic motor, and operatively connected to a component selected from the group consisting of a hydraulic piston attached to a tensioner roll, and a hydraulic piston attached to said housing for opening and closing said door member of said housing.

8. The baling apparatus set forth in claim 1, further including a computer and display operatively connected to said drive mechanism for controlling rotation and speed of said rollers and belts, and operatively connected to said wrap feeder to control wrap material fed into said baling cavity about a bale during a baling operation.

9. The baling apparatus set forth in claim 8, further including at least one contact sensor attached to said housing and operatively connected to said computer and display for sensing when a bale has reached maximum capacity within said baling cavity.

10. The baling apparatus set forth in claim 1, further including at least one auger positioned within said housing in parallel relation to said rollers, wherein said augers is used to drive and eject errant pieces of baling material from said housing.

* * * * *

UNITED STATES PATENT AND TRADEMARK OFFICE
CERTIFICATE OF CORRECTION

PATENT NO. : 10,721,872 B2
APPLICATION NO. : 14/716229
DATED : July 28, 2020
INVENTOR(S) : Daniel Gaudreault Page 1 of 1

It is certified that error appears in the above-identified patent and that said Letters Patent is hereby corrected as shown below:

In the first column, above FIELD OF THE INVENTION, the following should be added:
CROSS REFERENCE TO RELATED APPLICATIONS
This application claims priority to U.S. Provisional Application No. 62/000,221, filed May 19, 2014. entitled Baling Apparatus and Method. All of the foregoing applications are hereby incorporated by reference in their entireties.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*